United States Patent [19]

Nagai et al.

[11] Patent Number: 5,236,068
[45] Date of Patent: Aug. 17, 1993

[54] MID-RADIUS DISC BRAKE SHOE CONTACT PADS

[75] Inventors: Steve S. Nagai, Huron; Wolfgang Melinat, Dayton; Daniel E. Denlinger, Centerville, all of Ohio

[73] Assignee: General Motors Corporation, Detroit, Mich.

[21] Appl. No.: 938,571

[22] Filed: Aug. 28, 1992

Related U.S. Application Data

[63] Continuation of Ser. No. 833,581, Feb. 10, 1992, abandoned, which is a continuation of Ser. No. 575,538, Aug. 30, 1990, abandoned.

[51] Int. Cl.$^5$ ............ F16D 55/02; F16D 69/04
[52] U.S. Cl. ................. 188/71.7; 188/250 E
[58] Field of Search ............ 188/72.4, 73.31, 73.32, 188/73.36, 73.37, 73.39, 73.1, 250 R, 250 B, 250 G, 250 F, 73.45, 71.7, 250 E

[56] References Cited

U.S. PATENT DOCUMENTS

| 2,638,765 | 2/1972 | Flaherty et al. | 188/73.38 |
| 2,934,174 | 4/1960 | Lucien . | |
| 3,506,098 | 4/1970 | Anders . | |
| 4,130,186 | 12/1978 | de Gennes | 188/250 B X |
| 4,180,148 | 12/1979 | Souma | 188/73.38 |
| 4,508,199 | 4/1985 | Herbulot et al. | 18/250 B |
| 4,615,417 | 10/1986 | Schneider et al. | 188/73.39 X |
| 4,722,424 | 2/1988 | Ikeuchi | 188/73.37 |
| 4,940,119 | 7/1990 | Kondo et al. | 188/73.31 |

FOREIGN PATENT DOCUMENTS

| 3530059 | 3/1986 | Fed. Rep. of Germany ... 188/250 F |
| 2143916 | 2/1985 | United Kingdom ............... 188/73.1 |

Primary Examiner—Robert J. Oberleitner
Assistant Examiner—Peter M. Poon
Attorney, Agent, or Firm—Ernest E. Helms

[57] ABSTRACT

A disc brake is provided with a modified outer brake pad to brake flange contact area. The modified contact area leaves a substantial portion of the outer brake pad unsupported leading to reduced outer diameter/inner diameter radial taper wear of the brake pad.

5 Claims, 3 Drawing Sheets

MID-RADIUS DISC BRAKE SHOE CONTACT PADS

This is a continuation of application Ser. No. 07/833,581, filed on Feb. 10, 1992, now abandoned, which is a continuation of application Ser. No. 07/575,538, filed on Aug. 30, 1990, now abandoned.

FIELD OF THE INVENTION

This invention relates to a disc brake for a motor vehicle, and in particular to the mounting of an outboard brake pad to a caliper for a disc brake.

DISCLOSURE STATEMENT

It is well known on motor vehicles to provide a disc brake including a rotor, inner and outer brake pads (sometimes referred to as brake shoes). A caliper housing is also provided having a main portion with a cylindrical bore containing a piston for urging the inner brake pad into braking engagement with the rotor. An arm member of the caliper connected to the main portion of the housing by a bridge urges the outer brake pad into braking engagement with the rotor by reactive force upon actuation of the piston. The arm member (sometimes referred to as the caliper arm or flange) usually comprises two limbs which are substantially identical and symmetrical presenting substantially equally engaging surface areas to the outer brake pad. The above described type of disc brake is commonly referred to as a floating caliper type.

In use however it has been found that such an above described arrangement can often experience uneven wear of the lining on the outer brake pad between the outer brake pad's leading and trailing edges, and between the outer brake pads inner and outer radial edges. Such uneven wear can lead to sticking of the outer brake pad, and vibration, usually of the inner brake pad (which can generate brake squeal or noise). Additionally, uneven wear of the brake pad can lead to an increased requirement for movement of the brake piston therefore leading to a requirement of greater foot pedal travel to provide the same braking force for the braking system.

In U.S. patent application 523,805 now U.S. Pat. No. 5,036,932 commonly assigned, a brake caliper is disclosed which minimizes taper in the leading trailing direction of the outer brake pad. The present invention provides an apparatus which minimizes radial taper of the outboard brake pad from the interior diameter (ID) to the outer diameter (OD) of the brake pad.

Typically, the center of pressure on the outboard brake pad lining of the disc brake caliper is biased towards the top of the outboard lining because of caliper deflection. The above pressure bias has two negative consequences. First the brake lining tends to wear unevenly having a greater wear at its OD thus reducing its potential life. Second the effective radius of braking drops as the outer brake pad lining wears with and OD/ID taper. The drop in effective radius reduces the braking torque generated by the caliper.

OD/ID taper wear is primarily a function of approximately seven variables. The first variable which seems to be most important is the stiffness of the caliper bridge. (The portion of the caliper that covers the rotor and connects the caliper arm with the portion of the caliper which mounts the piston.) Secondly, the location of the centerline of the piston. Additionally, OD/ID taper is effected by the location of the area centroid of the outer brake pad, the location of the centroid of the area of the inner brake pad in relation to the centerline of the piston, and the relative amount of caliper rotation which occurs upon actuation of the brake, that is the amount of twist that the caliper has with respect to the frame of the vehicle. Other variables include the piston to the piston bore (cylinder) clearance and the compliance of the brake pad lining material.

The present invention assumes that the above mentioned seven variables are generally fixed. In practice the main variable which can be readily addressed is the stiffness of the caliper bridge. However, attempts to make the caliper bridge more stiff run in conflict with the environmentally mandated goal of lightening vehicle weight in order to increase fuel economy and is therefore not preferable.

The flexure of the caliper bridge along with the above noted variables combine to provide an uneven pressure profile between the arm of the caliper and the outboard pad shoe thereby contributing to the OD/ID taper.

To alleviate the above noted problem tapering of the outboard pad has been attempted however the results from such attempts were below expectations.

SUMMARY OF THE INVENTION

The present invention provides a sliding type disc brake caliper wherein an OD/ID taper wear is greatly reduced if not virtually eliminated.

It is the object of the present invention to provide a disc brake caliper with reduced OD/ID taper wear.

DETAILED DESCRIPTION OF THE DRAWINGS

Figure 1:
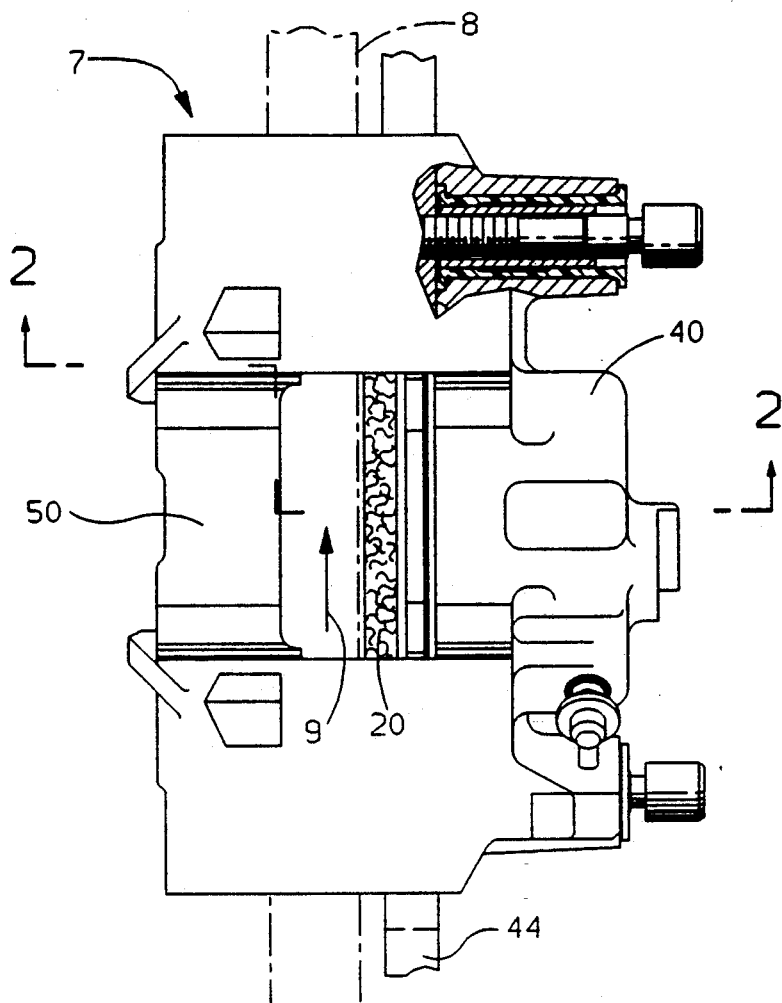
FIG. 1 is a top plane view of a preferred embodiment caliper according to the present invention.
Figure 2:
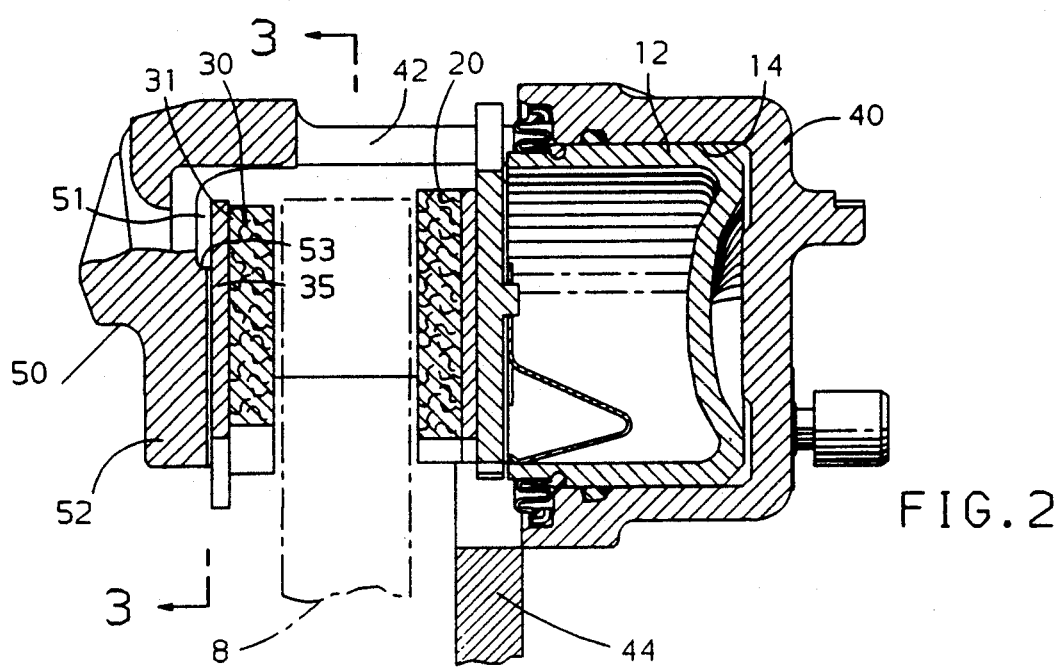
FIG. 2 is a view taken along lines 2—2 of FIG. 1.

A disc brake (7) in accordance with the present invention is shown in drawing FIGS. 1-2. The disc brake (7) includes a rotor (8) connected to a wheel (not shown) of a motor vehicle to rotate in the direction of arrow (9) when the motor vehicle is traveling in the forward direction. Positioned on opposite sides of the rotor (8) are inner and outer brake pads (20) and (30) respectively.

A piston (12) is slidably mounted in a cylindrical bore (14) in a caliper housing (40) adjacent the inner brake pad (20). The caliper housing (40) also includes a bridge (42) portion (commonly referred to as the saddle) which straddles the rotor (8). The caliper housing (40) also has an integral arm member (50) (commonly referred to as the outer flange) adjacent the outer brake pad (30).

The caliper housing (40) is slidably mounted with respect to a support member (44) which is secured to the motor vehicle. Typically, the caliper housing is slidably mounted on pins (48) which are fixed with respect to the support member (44) and sliding with respect to the caliper housing (40). Other caliper housings are fixed to the pin and the pin slides on the support. Still another alternative supporting system has the caliper mounted to the brake pads themselves and the brake pads are slidably mounted to the housing support as better described in Melinat U.S. Pat. No. 4,509,619 commonly assigned. The present invention can be used with all of these configurations.

On actuation of the disc brake by a vehicle operator, hydraulic fluid is pressurized in the cylindrical bore (14) to move the piston (12) towards the rotor (8). By the above mentioned action the piston (14) engages the inner brake pad (20) and urges it into braking engagement with the rotor (8). Substantially simultaneously by reactive force the caliper housing (40) slides on the pins (48) member such that the arm member (50) engages the outer brake pad (30) into braking engagement with the rotor (8).

Figure 3:
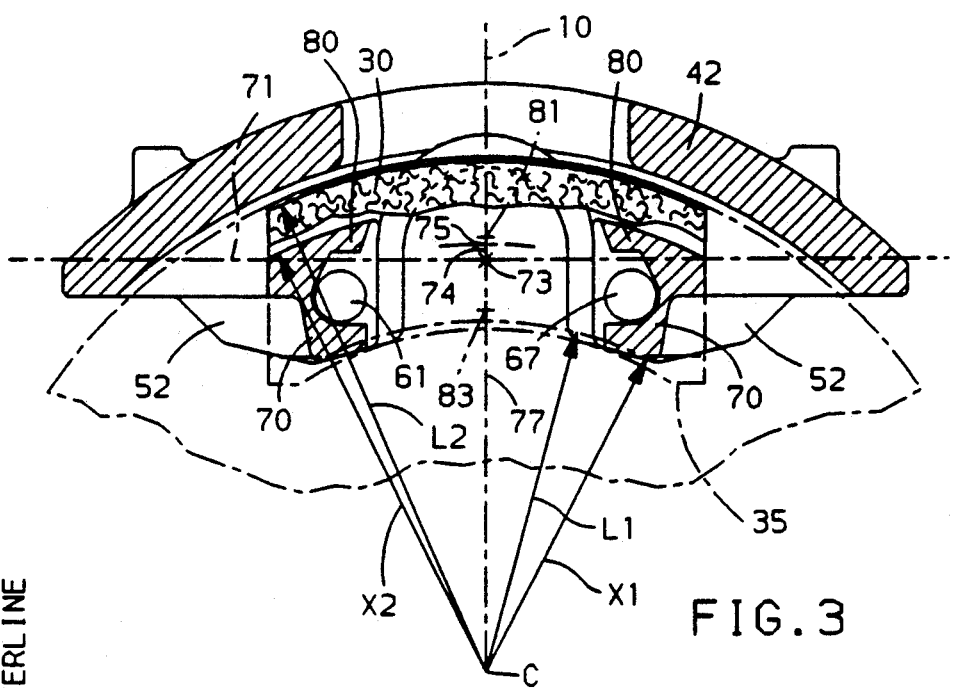
FIG. 3 is a view taken along lines 3—3 of FIG. 2 with some portions removed for clarity of illustration.

The arm member (50) is bifurcated to provide two limbs (52) (FIG. 3). The bifurcation is mainly due to the manufacturing necessity of allowing sufficient space for a boring tool to pass through between the limbs in order to machine the cylindrical bore (14).

Due to the actuation of the brake, there is a slight flexure of the arm's lower, end 53 (FIG. 2) in a direction away from the rotor (8). The limb configuration of the arm member (50) further adds to the flexure of the arm member (50).

The above mentioned flexure along with the other previously mentioned variables causes an uneven radial pressure distribution between the limbs of the caliper arm member and the outer brake pad. The greatest pressure will be at the radial extremities of the outer brake pad, and the force generally diminishes in a radial direction towards the rotative axis (8) of the rotor (18).

From theoretical and empirical studies the forced distribution can be assumed to be triangular (FIG. 6) in shape with the apex of the triangle pointed away from the bridge of the caliper housing in a direction almost parallel with the limb of the arm member.

In most disc brakes the outer pad does not directly contact the arm member but makes this contact through a metallic brake pad backing plate (35) and a nonmetallic insulator material (juxtaposed between the backing and the outer arm) which is provided to insulate vibrations from the brake pad in order to minimize brake squeal type noises. The present invention can be utilized with or without such a brake pad backing plate or backing plate with insulator type material.

Figure 7:
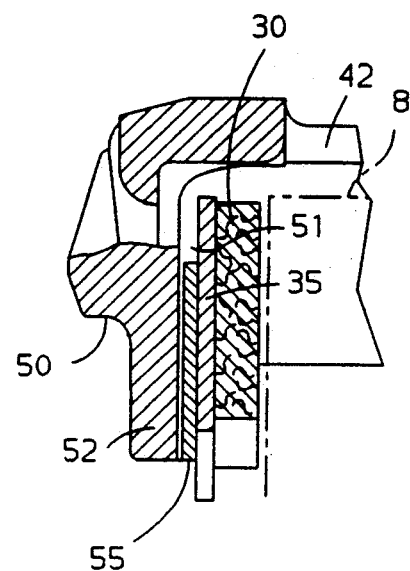
FIG. 7 is a view of the caliper are member having an offset accomplished by shims according to the present invention.

As mentioned previously, the pressure distribution between the arm member of the caliper and the brake pad or backing plate tends to be triangular in nature having a greater magnitude towards the top (radial extremity) of the brake pad than at the bottom thereby causing an undesirable OD/ID taper on the brake pad material. The present invention overcomes this problem by modifying the profile of the contact area between the brake pad and the caliper arm. NOTE: The contact area is the area where pressure from the arm member is transmitted to the brake pad. For practical purposes as long as the backing plate of the brake pad is thin (typically 0.03 in or less) the, backing plate can be ignored when determining the contact area. More specifically, the present invention provides a modified contact area between the outer brake pad and the arm member such that it counterbalances the triangular force distribution which would normally occur due to the flexure of the bridge and the other associated variables thereby providing a more even pressure distribution. This modification of the brake pad contact area is provided by providing an offset (51) of the arm member from the brake pad leading a substantial portion of the outer brake pad (30) unsupported along its end (31) most adjacent to the bridge (42) of the caliper. The offset (51) may be accomplished by a boss (53) on the arm member or by shims (55) (FIG. 7) between the caliper and the brake pad. Additionally it can be accomplished by the configuration of the insulator material deposited on the brake pad backing plate.

In providing the modified brake pad pressure contact area, one constraint is that contact area should be configured in such a manner that no area of the brake pad have a pressure force acting upon it of such magnitude that the insulator material between the backing plate and the arm member could be damaged.

To prevent the propagation of OD/ID taper wear the pressure center (found by a summation of the pressure force acting on the brake pad by the arm member) must align with the radial center of the lining pad to force symmetrical loading on the rotor pad inner face. By lowering (moving radially inward) the outer brake pad contact surface the pressure load profile, which is not uniform, can be made to align with the center of the pad. The above has the unique property of making the pressure load not only more uniform but also lower in peak value, thus the brake pad lining wears flat and at a slower rate.

By forcing the pressure center to match with the pad center, uniform wear may thus be achieved. It has been found to be preferable that the outer radius of the contact area ($X2$) be at a constant radius to prevent a sticking/releasing effect between the brake pad and rotor.

To determine $X2$ certain variables should be defined.
$L1$ = the inner radius of the lining of the brake pad material
$L2$ = outer radius of the brake pad lining material
$X1$ = the inner radius of the brake pad contact area
$FP$ = the summation of the pressure force of the rotor parallel to the axis of the rotation of the rotor exerted by the rotor upon the outer brake pad
$FA$ = the summation of the pressure force of the arm member applied against the outer brake pad
$RF$ = the radial location of the resolved $FP$
$XA$ = the radial location of the resolved $FA$ Ignoring the other previously mentioned variables which have an effect on OD/ID tapers and looking at the stiffness of the caliper housing itself a theoretically stiff caliper housing would have uniform pad loading upon a thin radial slice of the brake pad and:

$$RF = L1 + ((L2 - L1)/2) \qquad \text{(Equation 1)}$$

Figure 6:
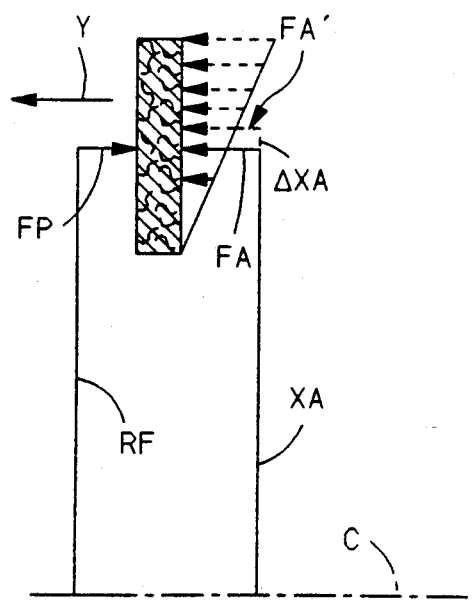
FIG. 6 and 6A are schematic diagrams of the pressure distribution on an outer brake pad.

The pressure applied forces are not distributed uniformly as mentioned previously but can be representative as a triangular load distribution (FIG. 6). The sum on the forces upon the outer brake pad can be represented by $FA$ at $XA$. Equation 2 calculates the incremental $XA$ (as a function of the angle A) based upon $X1$ and $X2$ $$XA = X1 + 2/3 \, (X2 - X1) \qquad \text{(Equation 2)}$$

Figure 6A:
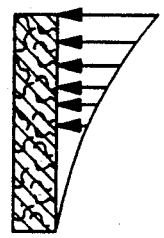

It has been found from theoretical and empirical studies that the triangular load distribution going from the bridge of the caliper towards the center of rotation of the rotor is a reasonable assumption and most deviations from the triangular shape pressure distribution do not result in greatly changed results. For instance if a parabolic distribution is assumed (FIG. 6A) the 0.667 (2/3) constant would instead be approximately 0.70. If a more exacting X2 is desired then an integration should be made of the force distribution from X1 to X2 to provide the incremental XA.

In order to satisfy $\Sigma MZ = O$ and $\Sigma FY = O$ $$\text{Then } \Sigma FY = O = FA - FP \quad \text{(Equation 3)}$$

Since the only apparent reaction forces come from FP or FA then:

$$\Sigma MZ = O = (XA)(FA) - (RF)(FP) \quad \text{(Equation 4)}$$

Solving equations 3 and 4 simultaneously:

$$(XA)(FA) = (RF)(FA) \quad \text{(Equation 5)}$$

and $$XA = RF \quad \text{(Equation 6)}$$

In order to satisfy the desire to force uniform loading into the inner brake pad, substitute equations 1 and 2 into equations 6 to derive:

$$X1 + 2/3 (X2 - X1) = L1 + ((L2 - L1)/2) \quad \text{(Equation 7)}$$

In a case where $X1 = L1$ and there is only a constant $R(\theta)$ for each radial dimension then equation seven reduces to:

$$X2 = (L2 + 3 L2)/4 \quad \text{(Equation 8)}$$

The above is a simplification from reality since no values of X1 equal L1 for all values of $\theta$, the exact solution at any angle $\theta$ is thus:

$$X2(\theta) = 3/4 \mathbf{1} (L1(\theta) + L2(\theta)) - 1/2 X1 (\theta) \quad \text{(Equation 9)}$$

For the assumption of triangular load distribution at the pad contact area.

The result of the modified pressure pad area (70) is that XA has been reduced by $\Delta$ XA since the top portions of the brake pad are now unsupported. The reduction in XA causes FA to act through the brake pad centroid of above it at FA'.

Figure 5:
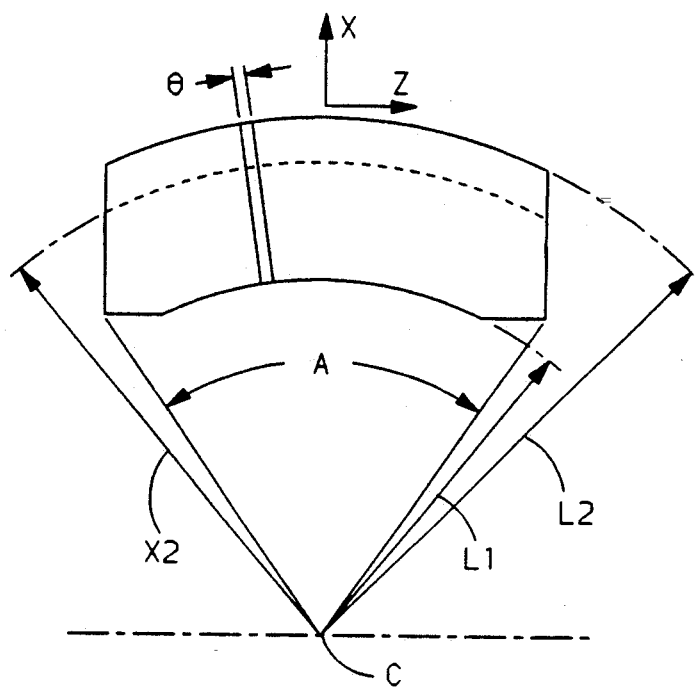
FIG. 5 is a schematic diagrams of a outer brake pad.

The task is then to calculate X2($\theta$) for each value of ($\theta$) over the angle A. Referring to FIG. 5, angle A is defined as being between an end of the outer brake pad to the opposite end. If L2 ($\theta$), L1($\theta$) and X1($\theta$) can be expressed as continuous functions of R and $\theta$ then an exact solution can be calculated by integrating equation 9 over the entire brake pad and dividing by the total included angle A. If the above is not the case then a value must be calculated for each value of $\theta$ utilizing a method of finite sectors.

It should also be noted where there is a discontinuity in the pad contact area (70) which mainly occurs due to the hold down holes (61) in which the arm member (50) mounts upon the outer brake pad to the arm member via the backing plate. Where discontinuities occur X1 is equal to X1 maximum + X2 minimum/2. X1 maximum and X1 minimum will be defined along a radial line projecting from the axial centerline of the rotor.

As mentioned previously the arm member (50) of the caliper housing (40) has two limbs (52) with spacing in between to allow for boring of the piston cylindrical bore (14). Intersecting with the radial centerline (75) of the brake pad (2), a radial line (10) is drawn intersecting with the rotational axis (8) of the rotor. The axial centerline (73) of the piston will usually intersect with radial line (10) and will typically be offset slightly from the radial centerline of the brake pad (75).

A plane (71) perpendicular to the radial line (10) and intersecting the centerline (73) of the piston bifurcates the brake pad contact surface areas (70), (80). The location of a centroid (81) of the (80) a centroid (81) of the area (80) above the plane (71)versus a centroid (83) of the area (70) below the plane (71) is usually within the ratios of 1:3 to 1:5 and preferably between 1:3.5 to 1:4.5.

The ratio of areas of the pad contact arm of the area (80) above the plane (71) to the area (80) below will typically be in a relationship of 1:3 to 1:5.

Figure 4:
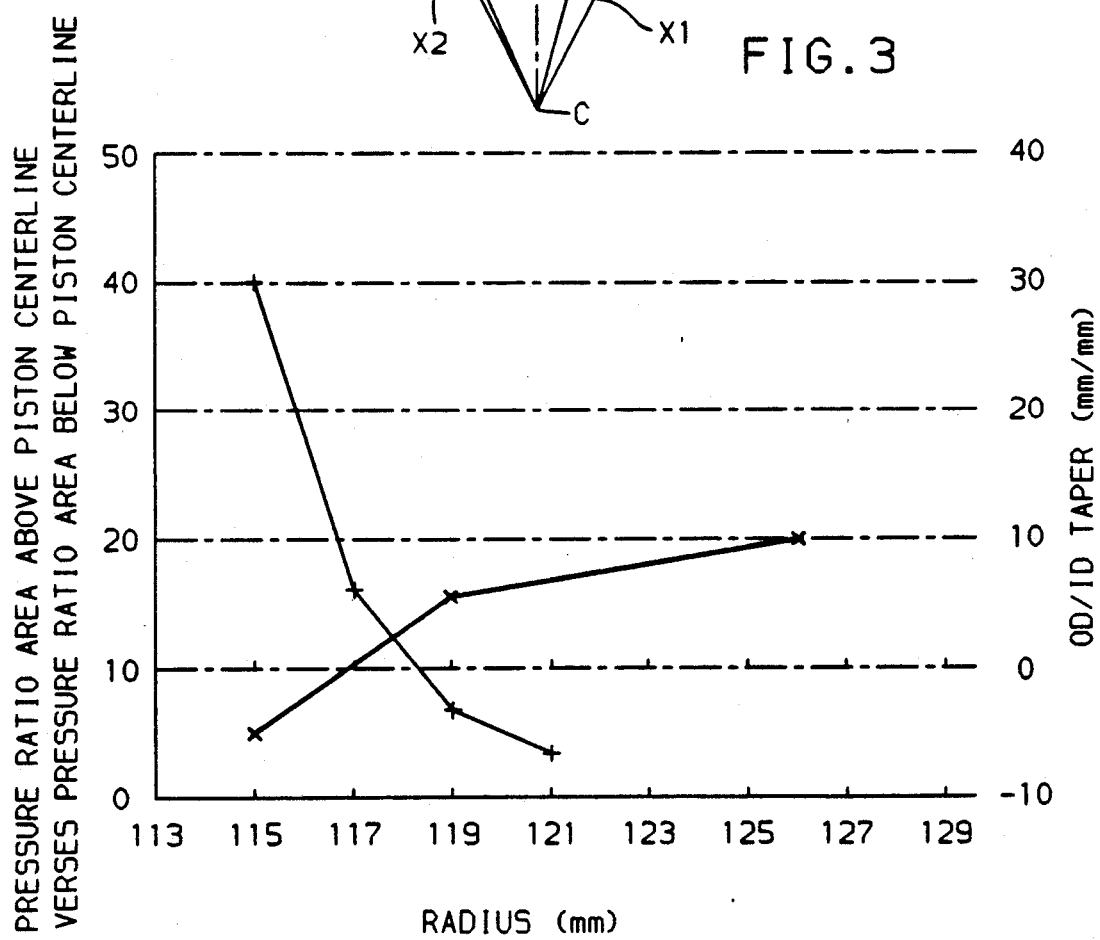
FIG. 4 is a graph illustrating relationship between the geometry of the contact surface and OD/ID taper and pressure distributors.

Referring to FIG. 4 an example is provided wherein the X2 radius was 117 millimeters. It was found by a movement of the X2 radius substantial differences in OD/ID taper were accomplished (FIG. 4). The minimum taper was accomplished at a point of approximately 116.8 centimeters. A 115 millimeter radius gave −5 OD/ID taper wear ratio and 119 millimeter radius gave approximately a 7 OD/ID taper wear ratio. At 117 mm the area ratio was 1:379 and the centroid ratio was 1:3.92.

The pressure ratio, equal to the summation of pressure force from the arm member to the brake pad acting above the plane (71) to below plane (71) at the ideal location was approximately 17. Thus the pressure ratio is utilized to ensure that the pressure at any given point along the contact area will not be so great as to harm the insulating material.

While a few of the embodiments of the present invention have been explained it will be readily apparent to those skilled in the art of the various modifications which can be made to the present invention without departing from the spirit and scope of this application as it is encompassed by the following claims:

We claim:

1. A method for reducing radial brake pad lining wear by calculating a contact area between a caliper arm member and an outer brake pad lining in a disc brake assembly having a caliper, a rotating disc and inner and outer friction brake pad linings;

the outer brake pad lining having the characteristics as defined by the method of:

providing an inner radius L1 from a center of rotation of a disc to an inner surface of the outer brake pad lining;

providing an outer radius L2 from the center of rotation of the disc to an outer surface of the outer brake pad lining;

providing an angle A between an end of the outer brake pad lining to the opposite end of the outer brake pad lining relative to the center of rotation of the disc;

providing a brake pad contact area as the area where the caliper arm member contacts the outer brake pad;

providing an inner radius X1 from the center of rotation to the inner radius of the outer brake pad contact area; and providing an outer radius X2 of the contact area from the center of rotation so as to satisfy the formula:

$$\int_0^A \frac{(3/4(L1 + L2) - X1/2)dA}{A} \pm 10\%.$$

2. A disc brake for a motor vehicle, the disc brake in combination comprising:
   a rotor with a center of rotation (C);
   inner and outer brake pads disposed on opposite sides of the rotor and movable into braking engagement therewith;
   a piston for urging the inner brake pad against the rotor, the piston having a centerline;
   a support member securable to the motor vehicle;
   a caliper housing slidably mounted with respect to the support member, the caliper housing having a cylinder positioned on one side of the rotor and containing the piston, and the caliper housing having an arm member on the other side of the rotor for urging the outer brake pad into engagement with the rotor when the piston acts on the inner brake pad; the outer brake pad having a surface of engagement with the brake rotor; and
   a contact surface for transmittal of compressive forces between the arm member and the outer brake pad allowing a substantial portion of the brake pad to be unsupported, the contact surface being divided by a plane generally perpendicular to a radial line from the center of rotation (C) and intersecting with the centerline of the piston and where the area of the contact surface above the dividing plane versus the area of the contact surface underneath the dividing plane is at a ratio range of 1:3 to 1:5 and the centroid of the area above the dividing plane to the area underneath the dividing plane is at a ratio range of 1:3.5 to 1:4.5.

3. A disc brake as described in claim 2 where the contact surface is provided by a shim between the outer brake pad and the arm of the caliper.

4. A disc brake as described in claim 2 wherein the contact surface for the outer brake pad is provided by a boss on the arm member.

5. A disc brake as described in claim 2 wherein the contact surface for the outer brake pad has a constant outer radius along angle A.

* * * * *